(12) United States Patent
Taherzadeh Boroujeni et al.

(10) Patent No.: US 12,192,954 B2
(45) Date of Patent: Jan. 7, 2025

(54) PAGING INDICATION OF CHANNEL STATE INFORMATION REFERENCE SIGNAL RESOURCES FOR BEAM REFINEMENT FOR A RANDOM ACCESS CHANNEL PROCEDURE

(71) Applicant: QUALCOMM Incorporated, San Diego, CA (US)

(72) Inventors: Mahmoud Taherzadeh Boroujeni, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/450,947

(22) Filed: Oct. 14, 2021

(65) Prior Publication Data
US 2022/0124671 A1 Apr. 21, 2022

Related U.S. Application Data

(60) Provisional application No. 63/198,427, filed on Oct. 16, 2020.

(51) Int. Cl.
| | |
|---|---|
| H04W 68/00 | (2009.01) |
| H04W 56/00 | (2009.01) |
| H04W 72/044 | (2023.01) |
| H04W 74/08 | (2024.01) |
| H04W 74/0833 | (2024.01) |

(52) U.S. Cl.
CPC ....... *H04W 68/005* (2013.01); *H04W 56/001* (2013.01); *H04W 72/046* (2013.01); *H04W 74/0841* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 2020/0053695 A1* | 2/2020 | Charbit | H04W 84/022 |
| 2020/0163048 A1* | 5/2020 | Kim | H04W 72/12 |
| 2020/0404620 A1* | 12/2020 | Sang | H04W 68/06 |
| 2021/0298083 A1 | 9/2021 | Taherzadeh Boroujeni et al. | |
| 2021/0306052 A1 | 9/2021 | Taherzadeh Boroujeni et al. | |
| 2022/0078848 A1* | 3/2022 | Hu | H04W 72/046 |
| 2022/0352953 A1* | 11/2022 | Huang | H04W 68/005 |

* cited by examiner

*Primary Examiner* — Marcus Smith
(74) *Attorney, Agent, or Firm* — Harrity & Harrity, LLP

(57) ABSTRACT

Various aspects of the present disclosure generally relate to wireless communication. In some aspects, a user equipment (UE) may receive a paging message that indicates a set of resources corresponding to a channel state information (CSI)-reference signal (CSI-RS) associated with a plurality of refined sub-beams of a synchronization signal block (SSB) beam. The UE may transmit, in a transmission associated with a physical random access channel (PRACH), an indication of a selected sub-beam of the plurality of refined sub-beams. Numerous other aspects are provided.

31 Claims, 9 Drawing Sheets

PAGING INDICATION OF CHANNEL STATE INFORMATION REFERENCE SIGNAL RESOURCES FOR BEAM REFINEMENT FOR A RANDOM ACCESS CHANNEL PROCEDURE

CROSS-REFERENCE TO RELATED APPLICATION

This Patent Application claims priority to U.S. Provisional Patent Application No. 63/198,427, filed on Oct. 16, 2020, entitled "PAGING INDICATION OF CHANNEL STATE INFORMATION REFERENCE SIGNAL RESOURCES FOR BEAM REFINEMENT FOR A RANDOM ACCESS CHANNEL PROCEDURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for paging indication of channel state information reference signal resources for beam refinement for a random access channel procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a paging message that indicates a set of resources corresponding to a channel state information (CSI) reference signal (CSI-RS) associated with a plurality of refined sub-beams of a synchronization signal block (SSB) beam; and transmitting, in a transmission associated with a physical random access channel (PRACH), an indication of a selected sub-beam of the plurality of refined sub-beams.

In some aspects, a method of wireless communication performed by a base station includes transmitting a paging message that indicates a set of resources corresponding to a CSI-RS associated with a plurality of refined sub-beams of an SSB beam; and receiving, in a transmission associated with a PRACH, an indication of a selected sub-beam of the plurality of refined sub-beams.

In some aspects, a UE for wireless communication includes a memory and one or more processors coupled to the memory, the one or more processors configured to: receive a paging message that indicates a set of resources corresponding to a CSI-RS associated with a plurality of refined sub-beams of an SSB beam; and transmit, in a transmission associated with a PRACH, an indication of a selected sub-beam of the plurality of refined sub-beams.

In some aspects, a base station for wireless communication includes a memory and one or more processors coupled to the memory, the one or more processors configured to: transmit a paging message that indicates a set of resources corresponding to a CSI-RS associated with a plurality of refined sub-beams of an SSB beam; and receive, in a transmission associated with a PRACH, an indication of a selected sub-beam of the plurality of refined sub-beams.

In some aspects, a non-transitory computer-readable medium storing a set of instructions for wireless communication includes one or more instructions that, when executed by one or more processors of a UE, cause the UE to receive a paging message that indicates a set of resources corresponding to a CSI-RS associated with a plurality of refined sub-beams of an SSB beam; and transmit, in a transmission associated with a PRACH, an indication of a selected sub-beam of the plurality of refined sub-beams.

In some aspects, a non-transitory computer-readable medium storing a set of instructions for wireless communication includes one or more instructions that, when executed by one or more processors of a base station, cause the base station to transmit a paging message that indicates a set of resources corresponding to a CSI-RS associated with a plurality of refined sub-beams of an SSB beam; and receive, in a transmission associated with a PRACH, an indication of a selected sub-beam of the plurality of refined sub-beams.

In some aspects, an apparatus for wireless communication includes means for receiving a paging message that indicates a set of resources corresponding to a CSI-RS associated with a plurality of refined sub-beams of an SSB beam; and means for transmitting, in a transmission associated with a PRACH, an indication of a selected sub-beam of the plurality of refined sub-beams.

In some aspects, an apparatus for wireless communication includes means for transmitting a paging message that indicates a set of resources corresponding to a CSI-RS associated with a plurality of refined sub-beams of an SSB beam; and means for receiving, in a transmission associated with a PRACH, an indication of a selected sub-beam of the plurality of refined sub-beams.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
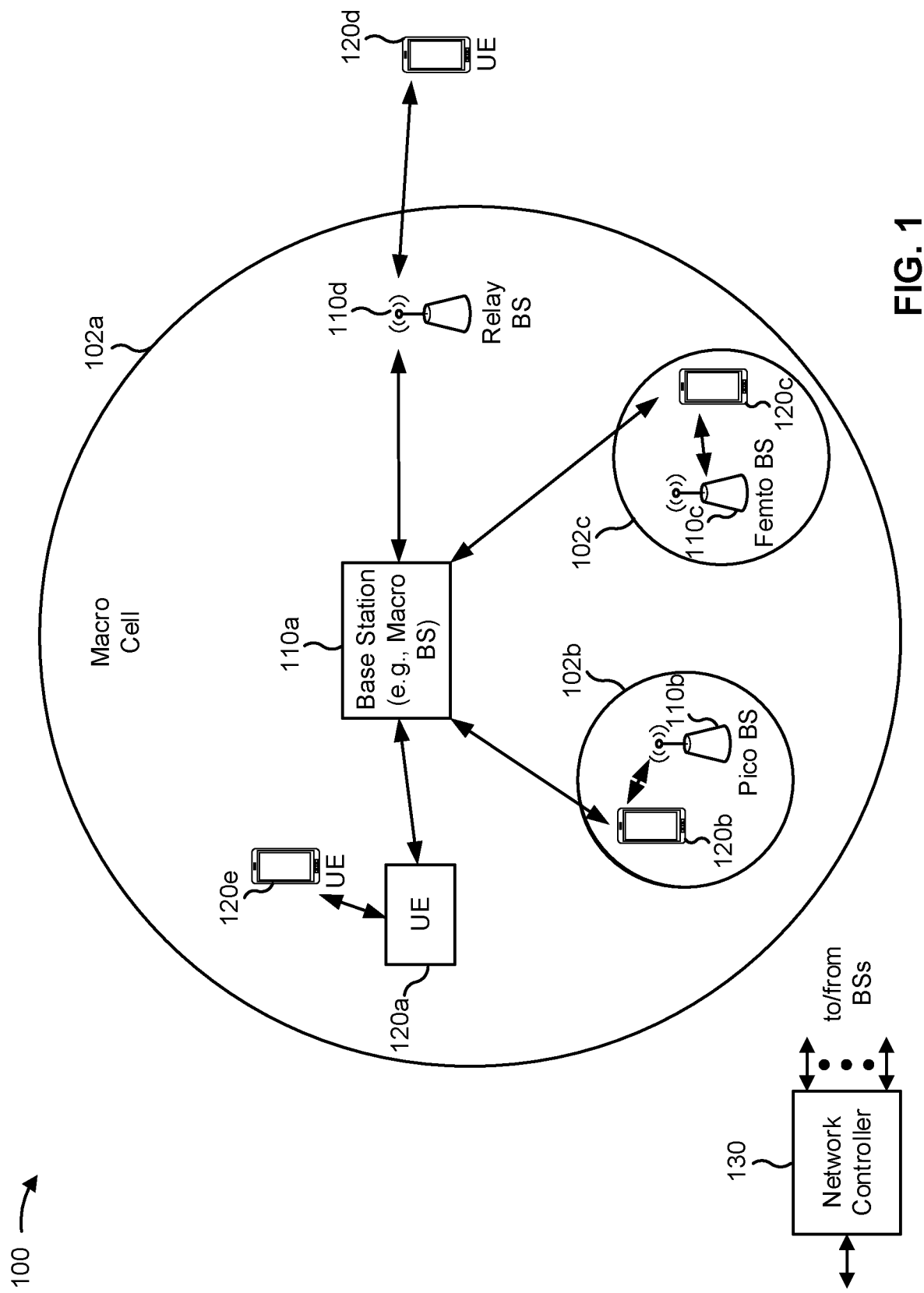
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
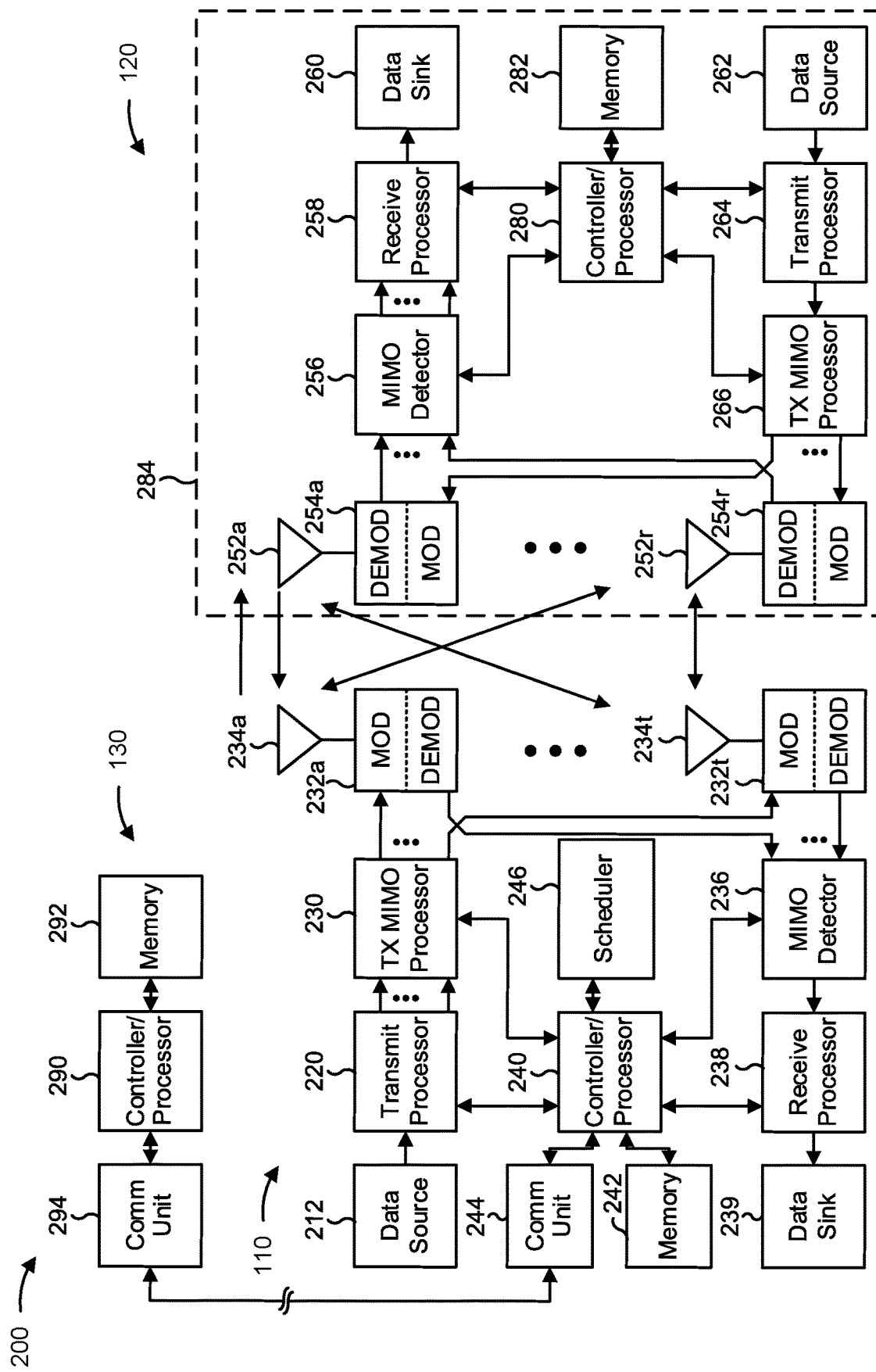
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-9).

Controller/processor 240 of base station 110, controller/processor 280 of UE 120, and/or any other component(s) of FIG. 2 may perform one or more techniques associated with paging indication of channel state information (CSI) reference signal (CSI-RS) resources for beam refinement for a random access channel (RACH) procedure, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving a paging message that indicates a set of resources corresponding to a CSI-RS associated with a plurality of refined sub-beams of a synchronization signal block (SSB) beam and/or means for transmitting, in a transmission associated with a physical random access channel (PRACH), an indication of a selected sub-beam of the plurality of refined sub-beams, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples.

In some aspects, base station 110 may include means for transmitting a paging message that indicates a set of resources corresponding to a CSI-RS associated with a plurality of refined sub-beams of a SSB beam and/or means for receiving, in a transmission associated with a PRACH, an indication of a selected sub-beam of the plurality of refined sub-beams, among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
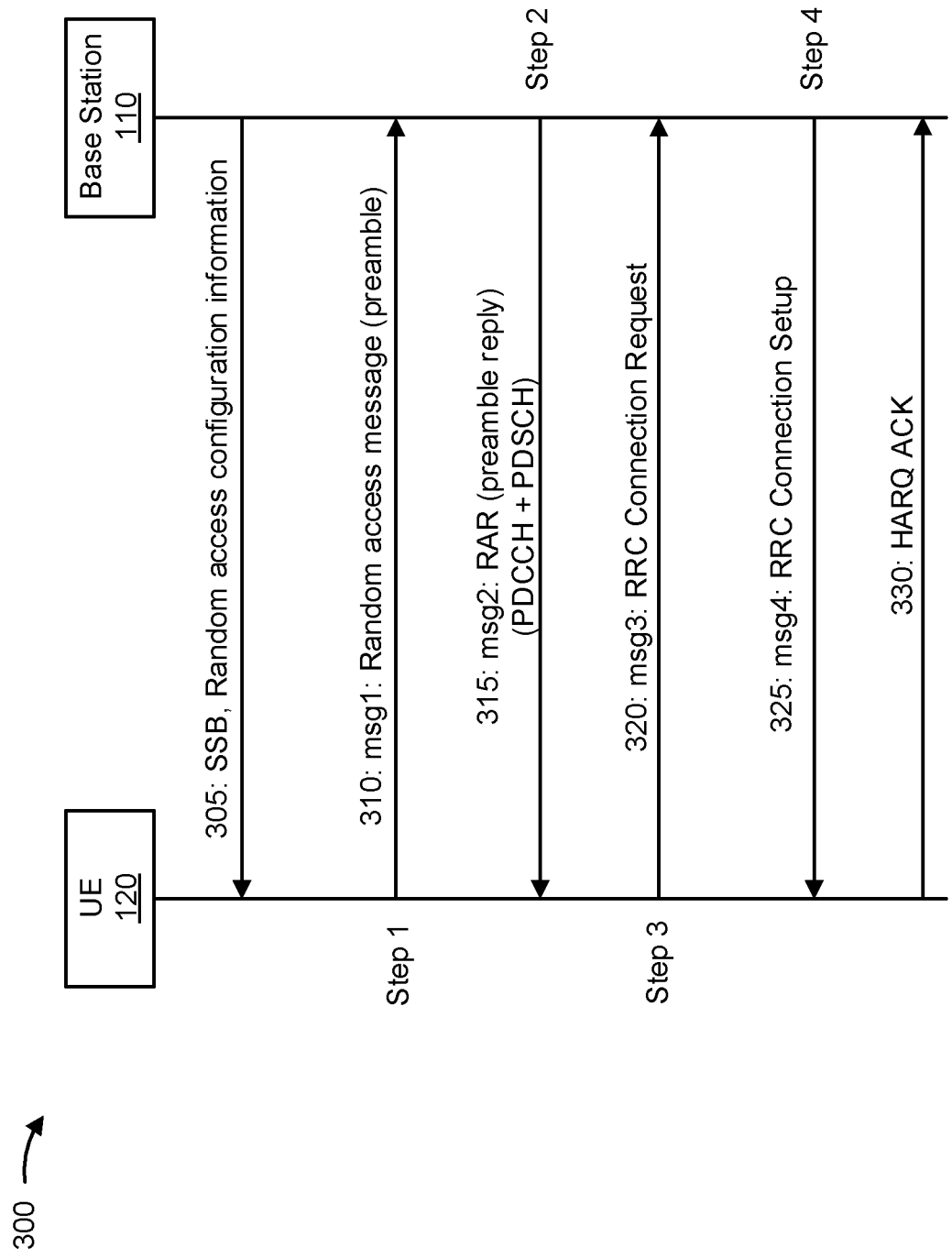
FIG. 3 is a diagram illustrating an example of a four-step random access procedure, in accordance with the present disclosure.

FIG. 3 is a diagram illustrating an example of a four-step RACH operation, in accordance with the present disclosure. As shown in FIG. 3, a base station 110 and a UE 120 may communicate with one another to perform the four-step random access procedure.

As shown by reference number 305, the base station 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM) and/or one or more parameters for receiving a random access response (RAR), among other examples.

As shown by reference number 310, the UE 120 may transmit a RAM with a RACH request via a PRACH. The RAM may include a preamble (sometimes referred to as a random access preamble, a PRACH preamble, and/or a RAM preamble, among other examples). The message that includes the preamble may be referred to as a message 1, msg1, MSG1, a first message, and/or an initial message, in a four-step random access procedure. The random access message may include a random access preamble identifier.

As shown by reference number 315, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3) (see below).

In some aspects, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 320, the UE 120 may transmit an RRC connection request message. The RRC connection request message may be referred to as message 3, msg3, MSG3, a UE identification message, or a third message of a four-step random access procedure. In some aspects, the RRC connection request may include a UE identifier, uplink control information (UCI), and/or a physical uplink shared channel (PUSCH) communication (e.g., an RRC connection request), among other examples.

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information, among other examples. As shown by reference number 330, if the UE 120 successfully receives the RRC connection setup message, the UE 120 may transmit a hybrid automatic repeat request (HARQ) acknowledgement (ACK).

As indicated above, FIG. 3 is provided as an example. Other examples may differ from what is described with regard to FIG. 3.

Figure 4:
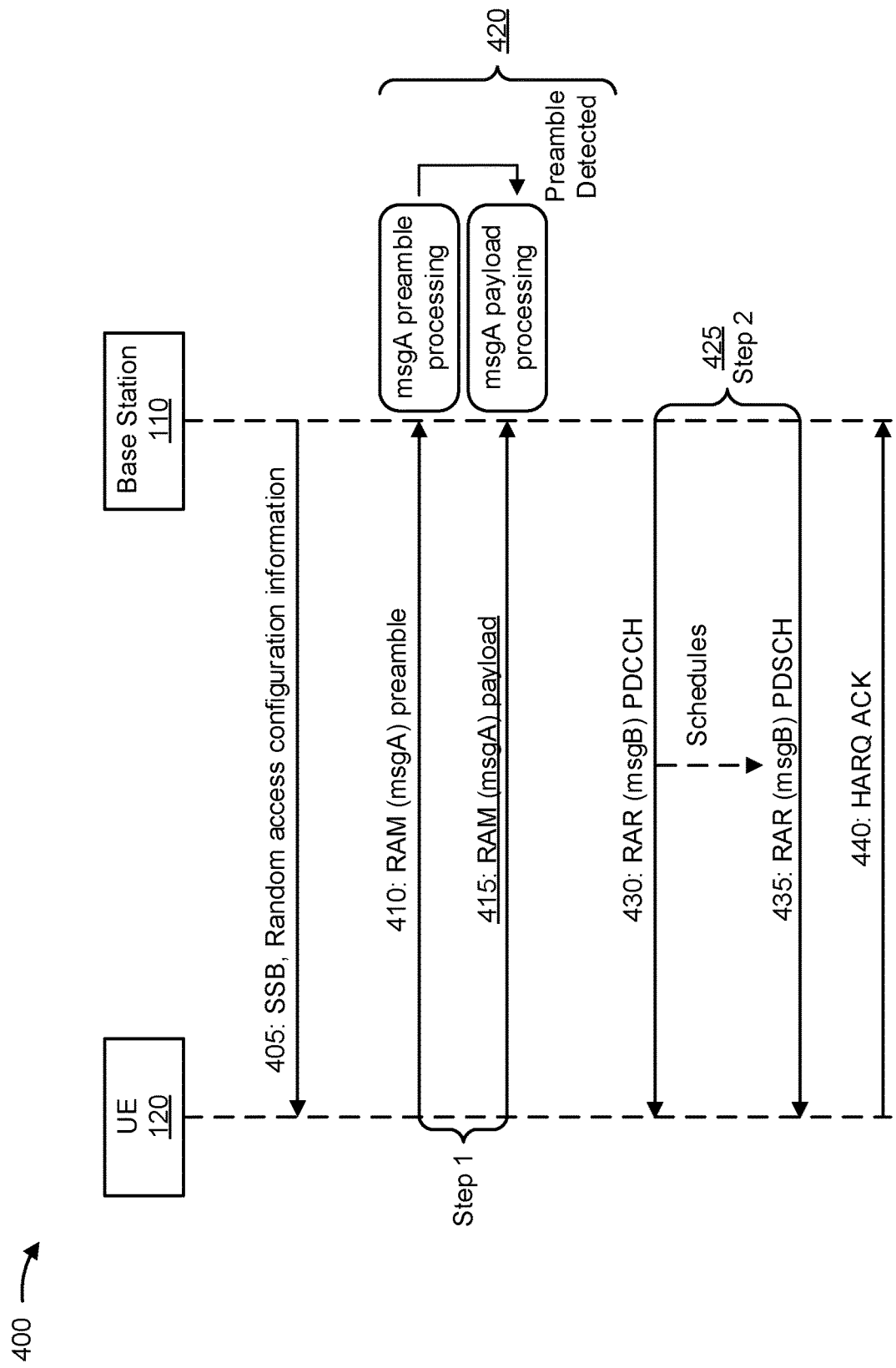
FIG. 4 is a diagram illustrating an example of a two-step random access procedure, in accordance with the present disclosure.

FIG. 4 is a diagram illustrating an example 400 of a two-step random access procedure, in accordance with various aspects of the present disclosure. As shown in FIG. 4, a base station 110 and a UE 120 may communicate with one another to perform the two-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs among other examples) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the two-step random access procedure, such as one or more parameters for transmitting a RAM, and/or receiving an RAR to the RAM, among other examples.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, an uplink message, a request message, a first message, an initial message, and/or the like in a two-step random access procedure. Furthermore, in some aspects, the RAM preamble may be referred to as a message A preamble, a msgA preamble, a preamble, and/or a PRACH preamble, among other examples, and the RAM payload may be referred to as a message A payload, a msgA payload, and/or a payload, among other examples. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, UCI, and/or a PUSCH transmission, among other examples).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, a response message, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information, among other examples.

As shown by reference number 430, as part of the second step of the two-step random access procedure, the base station 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 435, as part of the second step of the two-step random access procedure, the base station 110 may transmit the PDSCH communication for the RAR, as scheduled by the PDCCH communication. The RAR may be included in a MAC-PDU of the PDSCH communication. As shown by reference number 440, if the UE 120 successfully receives the RAR, the UE 120 may transmit a HARQ-ACK.

As indicated above, FIG. 4 is provided as an example. Other examples may differ from what is described with regard to FIG. 4.

RACH procedures may have coverage limitations, which may cause negative impacts on network performance. In some cases, RACH messages at frequency ranges of greater than or equal to about 24 Gigahertz may be missed by UEs or inaccurately decoded by UEs. As a result, RRC connection setup messages may not be transmitted effectively, compromising network connection.

Aspects of techniques described herein may facilitate beam refinement during RACH procedures. For example, aspects may enable a base station to schedule a CSI-RS using a paging message. In this way, the UE may receive the CSI-RS and provide CSI feedback in the UE identification message. Thus, aspects may enable beam refinement during the RACH procedure, which may result in coverage enhancement for RRC connection, which may positively impact network performance.

Figure 5:
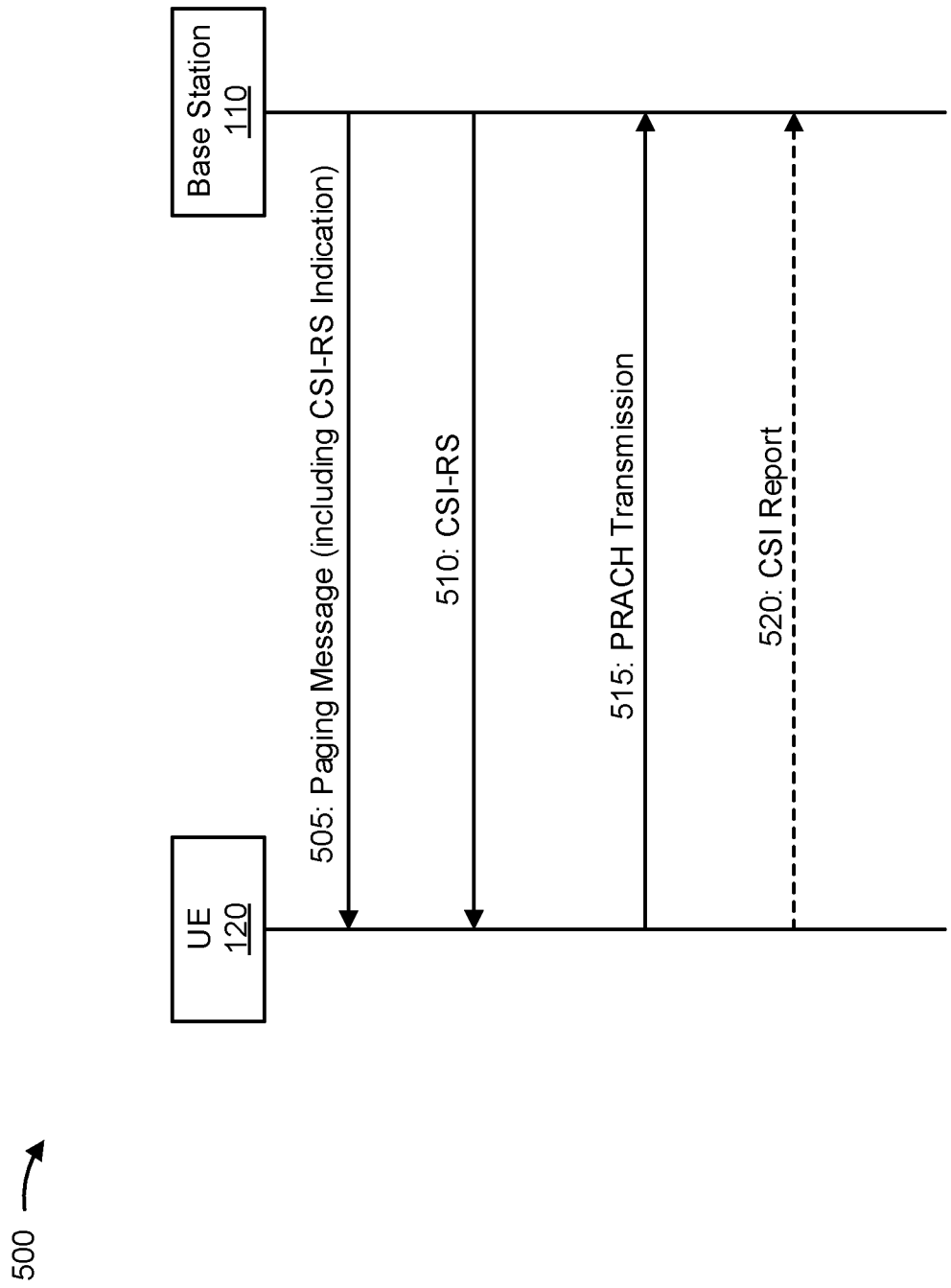
FIG. 5 is a diagram illustrating an example associated with paging indication of channel state information (CSI) reference signal (CSI-RS) resources for beam refinement for a random access channel (RACH) procedure, in accordance with the present disclosure.

FIG. 5 is a diagram illustrating an example 500 associated with paging indication of CSI-RS resources for beam refinement for a RACH procedure, in accordance with the present disclosure. As shown in FIG. 5, a base station 110 and a UE 120 may communicate with one another.

As shown by reference number 505, the base station 110 may transmit, and the UE 120 may receive, a paging message. The paging message may include a CSI-RS indication. The CSI-RS indication may indicate a set of resources corresponding to a CSI-RS that is scheduled to be transmitted to the UE 120. The CSI-RS may be associated with a plurality of refined sub-beams of an SSB beam. The set of resources corresponding to the CSI-RS may include at least one of: a time domain resource, or a frequency domain resource. In some aspects, the CSI feedback indication may indicate at least one of: CSI to be included in the CSI feedback, or a parameter associated with the CSI feedback.

As shown by reference number 510, the base station 110 may transmit, and the UE 120 may receive, the CSI-RS. As shown by reference number 515, the UE 120 may transmit, and the base station 110 may receive, a PRACH transmission. As shown by reference number 520, the UE 120 may transmit, and the base station 110 may receive, a CSI report. The CSI report may include an indication of a selected sub-beam of a plurality of refined sub-beams. The CSI report may be transmitted in a transmission associated with the PRACH.

As indicated by the dashed arrow, the UE 120 may transmit the CSI report after transmitting the PRACH transmission. In some aspects, the transmission may include a PUSCH transmission that occurs after a transmission of a random access channel preamble. In some aspects, the transmission may be based at least in part on a mapping between at least one RACH occasion and at least one resource associated with the CSI report. The mapping may be defined in a wireless communication specification. In some aspects, the paging message indicates the mapping.

In some aspects, the UE 120 may transmit the CSI report as part of the PRACH transmission. The transmission associated with the PRACH may include a PRACH transmission. The set of resources corresponding to the CSI-RS may be explicitly scheduled by the paging message.

In some aspects, the set of resources corresponding to the CSI-RS may be implicitly indicated. For example, the set of resources may be implicitly indicated based at least in part on one or more parameters indicated by the paging message. In some aspects, the one or more parameters may include at least one of: a time resource associated with one or more RACH occasions of the PRACH, or a frequency resource associated with one or more RACH occasions of the PRACH. The UE 120 may determine the set of resources corresponding to the CSI-RS based at least in part on the one or more parameters.

In some aspects, the CSI report may include an indication of a selected sub-beam (e.g., a "best sub-beam"). The UE 120 may transmit the indication of the selected sub-beam by transmitting an indication of at least one of: a selected preamble sequence, or a selected RACH occasion corresponding to the selected preamble sequence. In some aspects, the indication of the selected sub-beam may be based at least in part on a mapping of the plurality of refined sub-beams to at least one of: a plurality of preamble sequences comprising the selected preamble sequence, or a plurality of RACH occasions comprising the selected RACH occasion.

In some aspects, the mapping of the plurality of refined sub-beams may include a mapping of the set of resources corresponding to the CSI-RS to the at least one of: the plurality of preamble sequences comprising the selected preamble sequence, or the plurality of RACH occasions comprising the selected RACH occasion. In some aspects, the mapping may be based at least in part on a rule defined in a wireless communication specification. In some aspects, the mapping may be based at least in part on one or more mapping parameters. The one or more mapping parameters may be indicated by at least one of: the paging message, remaining minimum system information, or other system information.

In some aspects, the transmission may include a PUSCH portion of a request message of a two-step random access channel procedure. The paging message may indicate the set of resources corresponding to the CSI-RS based at least in part on at least one of: a determination that the SSB beam satisfies an SSB beam condition, a determination that one or more beam-specific bitfields in remaining minimum system information include one or more specified values, or a determination that a beam-specific property associated with the paging message satisfies a paging condition. The UE 120 may receive the paging message based at least in part on the SSB comprising one of a subset of SSB beams of a set of SSB beams.

According to aspects of the techniques discussed above, CSI-RS scheduling for beam refinement may be performed before a RACH procedure has begun. In this way, aspects may enable coverage enhancements associated with beam refinement during a RACH operation, which may positively impact network performance.

As indicated above, FIG. 5 is provided as an example. Other examples may differ from what is described with respect to FIG. 5.

Figure 6:
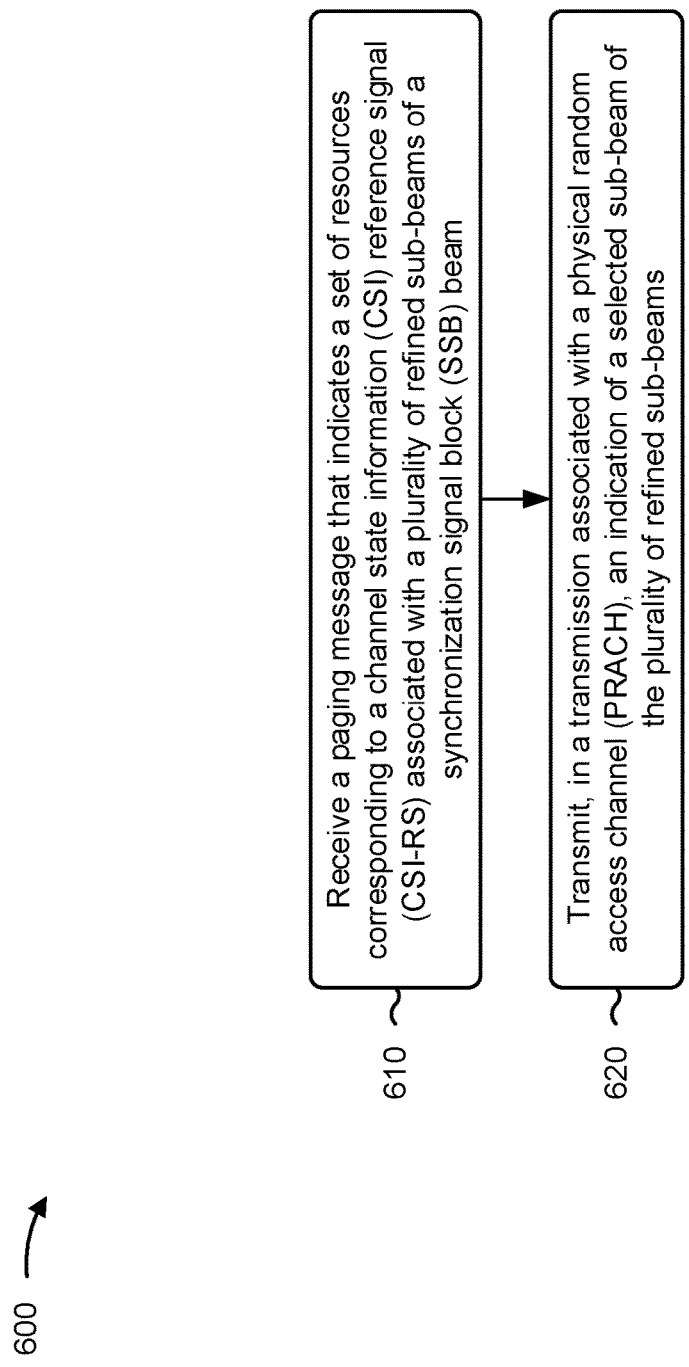
FIGS. 6 and 7 are diagrams illustrating example processes associated with paging indication of CSI-RS resources for beam refinement for a RACH procedure, in accordance with the present disclosure.

FIG. 6 is a diagram illustrating an example process 600 performed, for example, by a UE, in accordance with the present disclosure. Example process 600 is an example where the UE (e.g., UE 120) performs operations associated with paging indication of CSI-RS resources for beam refinement for a RACH procedure.

As shown in FIG. 6, in some aspects, process 600 may include receiving a paging message that indicates a set of resources corresponding to a CSI-RS associated with a plurality of refined sub-beams of an SSB beam (block 610). For example, the UE (e.g., using reception component 802, depicted in FIG. 8) may receive a paging message that indicates a set of resources corresponding to a CSI-RS associated with a plurality of refined sub-beams of an SSB beam, as described above.

As further shown in FIG. 6, in some aspects, process 600 may include transmitting, in a transmission associated with a PRACH, an indication of a selected sub-beam of the plurality of refined sub-beams (block 620). For example, the UE (e.g., using transmission component 804, depicted in FIG. 8) may transmit, in a transmission associated with a PRACH, an indication of a selected sub-beam of the plurality of refined sub-beams, as described above.

Process 600 may include additional aspects, such as any single aspect or any combination of aspects described below and/or in connection with one or more other processes described elsewhere herein.

In a first aspect, the transmission associated with the PRACH comprises a PRACH transmission.

In a second aspect, alone or in combination with the first aspect, the set of resources corresponding to the CSI-RS are explicitly scheduled by the paging message.

In a third aspect, alone or in combination with one or more of the first and second aspects, the set of resources corresponding to the CSI-RS are implicitly indicated based at least in part on one or more parameters indicated by the paging message.

In a fourth aspect, alone or in combination with one or more of the first through third aspects, the one or more parameters comprise at least one of a time resource associated with one or more RACH occasions of the PRACH, or a frequency resource associated with one or more RACH occasions of the PRACH.

In a fifth aspect, alone or in combination with one or more of the first through fourth aspects, process 600 includes determining the set of resources corresponding to the CSI-RS based at least in part on the one or more parameters.

In a sixth aspect, alone or in combination with one or more of the first through fifth aspects, transmitting the indication of the selected sub-beam comprises transmitting an indication of at least one of a selected preamble sequence, or a selected RACH occasion corresponding to the selected preamble sequence.

In a seventh aspect, alone or in combination with one or more of the first through sixth aspects, the indication of the selected sub-beam is based at least in part on a mapping of the plurality of refined sub-beams to at least one of a plurality of preamble sequences comprising the selected preamble sequence, or a plurality of RACH occasions comprising the selected RACH occasion.

In an eighth aspect, alone or in combination with one or more of the first through seventh aspects, the mapping of the plurality of refined sub-beams comprises a mapping of the set of resources corresponding to the CSI-RS to the at least one of the plurality of preamble sequences comprising the selected preamble sequence, or the plurality of RACH occasions comprising the selected RACH occasion.

In a ninth aspect, alone or in combination with one or more of the first through eighth aspects, the mapping is based at least in part on a rule.

In a tenth aspect, alone or in combination with one or more of the first through ninth aspects, the rule is defined in a wireless communication specification.

In an eleventh aspect, alone or in combination with one or more of the first through tenth aspects, the mapping is based at least in part on one or more mapping parameters.

In a twelfth aspect, alone or in combination with one or more of the first through eleventh aspects, the one or more mapping parameters are indicated by at least one of the paging message, remaining minimum system information, or other system information.

In a thirteenth aspect, alone or in combination with one or more of the first through twelfth aspects, the transmission associated with the PRACH comprises a CSI report associated with the PRACH.

In a fourteenth aspect, alone or in combination with one or more of the first through thirteenth aspects, the transmission is based at least in part on a mapping between at least one RACH occasion and at least one resource associated with the CSI report.

In a fifteenth aspect, alone or in combination with one or more of the first through fourteenth aspects, the mapping is defined in a wireless communication specification.

In a sixteenth aspect, alone or in combination with one or more of the first through fifteenth aspects, the paging message indicates the mapping.

In a seventeenth aspect, alone or in combination with one or more of the first through sixteenth aspects, the transmission comprises a PUSCH transmission that occurs after a transmission of a random access channel preamble.

In an eighteenth aspect, alone or in combination with one or more of the first through seventeenth aspects, the transmission comprises a PUSCH portion of a request message of a two-step random access channel procedure.

In a nineteenth aspect, alone or in combination with one or more of the first through eighteenth aspects, the paging message indicates the set of resources corresponding to the CSI-RS based at least in part on at least one of a determination that the SSB beam satisfies an SSB beam condition, a determination that one or more beam-specific bitfields in remaining minimum system information include one or more specified values, or a determination that a beam-specific property associated with the paging message satisfies a paging condition.

In a twentieth aspect, alone or in combination with one or more of the first through nineteenth aspects, receiving the paging message comprises receiving the paging message based at least in part on the SSB comprising one of a subset of SSB beams of a set of SSB beams.

In a twenty-first aspect, alone or in combination with one or more of the first through twentieth aspects, the set of resources corresponding to the CSI-RS comprises at least one of a time domain resource, or a frequency domain resource.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
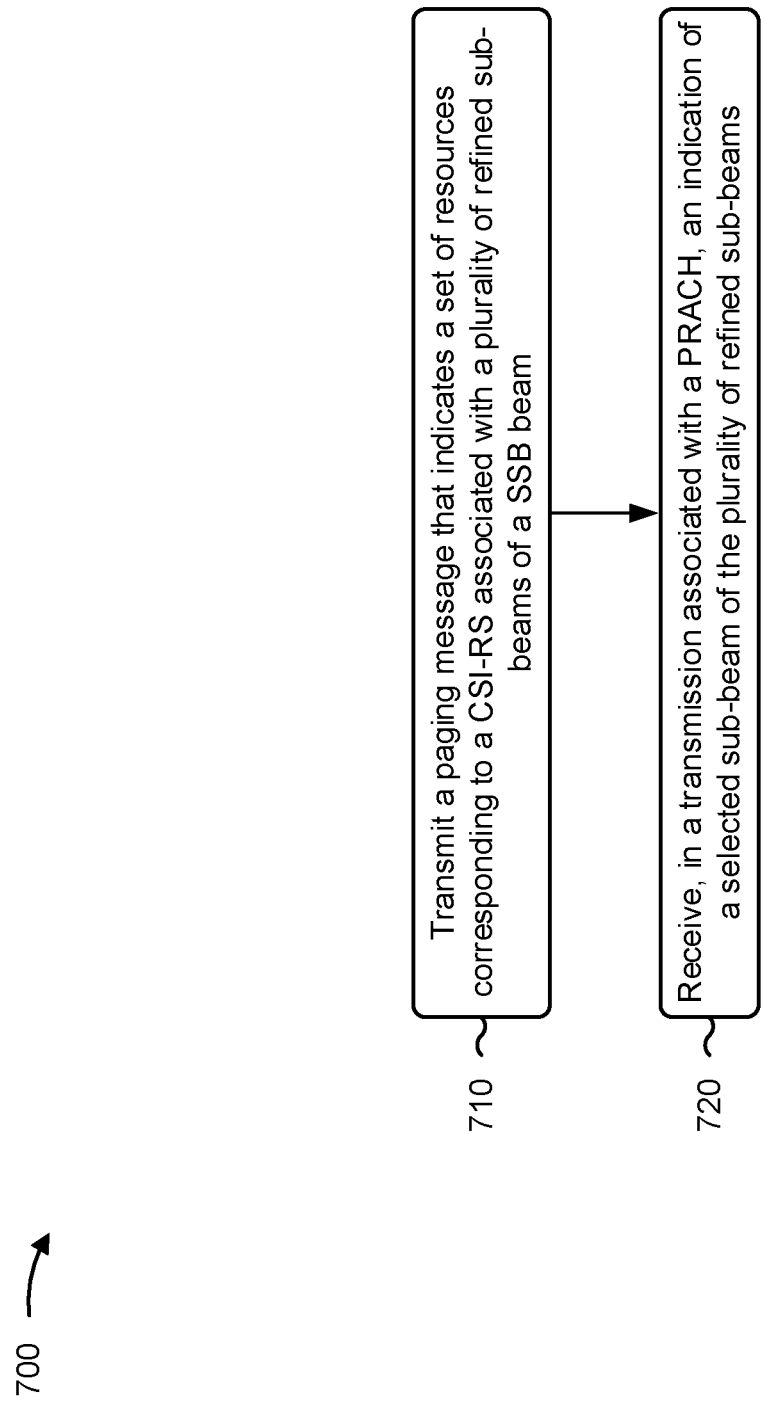

FIG. 7 is a diagram illustrating an example process 700 performed, for example, by a base station, in accordance with the present disclosure. Example process 700 is an example where the base station (e.g., base station 110) performs operations associated with paging indication of CSI-RS resources for beam refinement for a RACH procedure.

As shown in FIG. 7, in some aspects, process 700 may include transmitting a paging message that indicates a set of resources corresponding to a CSI-RS associated with a plurality of refined sub-beams of an SSB beam (block 710). For example, the base station (e.g., using transmission component 904, depicted in FIG. 9) may transmit a paging message that indicates a set of resources corresponding to a CSI-RS associated with a plurality of refined sub-beams of an SSB beam, as described above.

As further shown in FIG. 7, in some aspects, process 700 may include receiving, in a transmission associated with a PRACH, an indication of a selected sub-beam of the plurality of refined sub-beams (block 720). For example, the base station (e.g., using reception component 902, depicted in FIG. 9) may receive, in a transmission associated with a PRACH, an indication of a selected sub-beam of the plurality of refined sub-beams, as described above.

Process 700 may include additional aspects, such as any single aspect or any combination of aspects described below and/or in connection with one or more other processes described elsewhere herein.

In a first aspect, the transmission associated with the PRACH comprises a PRACH transmission.

In a second aspect, alone or in combination with the first aspect, the set of resources corresponding to the CSI-RS are explicitly scheduled by the paging message.

In a third aspect, alone or in combination with one or more of the first and second aspects, the set of resources corresponding to the CSI-RS are implicitly indicated based at least in part on one or more parameters indicated by the paging message.

In a fourth aspect, alone or in combination with one or more of the first through third aspects, the one or more parameters comprise at least one of a time resource associated with one or more RACH occasions of the PRACH, or a frequency resource associated with one or more RACH occasions of the PRACH.

In a fifth aspect, alone or in combination with one or more of the first through fourth aspects, receiving the indication of the selected sub-beam comprises receiving an indication of at least one of a selected preamble sequence, or a selected RACH occasion corresponding to the selected preamble sequence.

In a sixth aspect, alone or in combination with one or more of the first through fifth aspects, the indication of the selected sub-beam is based at least in part on a mapping of the plurality of refined sub-beams to at least one of a plurality of preamble sequences comprising the selected preamble sequence, or a plurality of RACH occasions comprising the selected RACH occasion.

In a seventh aspect, alone or in combination with one or more of the first through sixth aspects, the mapping of the plurality of refined sub-beams comprises a mapping of the set of resources corresponding to the CSI-RS to the at least one of the plurality of preamble sequences comprising the selected preamble sequence, or the plurality of RACH occasions comprising the selected RACH occasion.

In an eighth aspect, alone or in combination with one or more of the first through seventh aspects, the mapping is based at least in part on a rule.

In a ninth aspect, alone or in combination with one or more of the first through eighth aspects, the rule is defined in a wireless communication specification.

In a tenth aspect, alone or in combination with one or more of the first through ninth aspects, the mapping is based at least in part on one or more mapping parameters.

In an eleventh aspect, alone or in combination with one or more of the first through tenth aspects, the one or more mapping parameters are indicated by at least one of the paging message, remaining minimum system information, or other system information.

In a twelfth aspect, alone or in combination with one or more of the first through eleventh aspects, the transmission associated with the PRACH comprises a CSI report associated with the PRACH.

In a thirteenth aspect, alone or in combination with one or more of the first through twelfth aspects, the transmission is based at least in part on a mapping between at least one RACH occasion and at least one resource associated with the CSI report.

In a fourteenth aspect, alone or in combination with one or more of the first through thirteenth aspects, the mapping is defined in a wireless communication specification.

In a fifteenth aspect, alone or in combination with one or more of the first through fourteenth aspects, the paging message indicates the mapping.

In a sixteenth aspect, alone or in combination with one or more of the first through fifteenth aspects, the transmission comprises a PUSCH transmission that occurs after a transmission of a random access channel preamble.

In a seventeenth aspect, alone or in combination with one or more of the first through sixteenth aspects, the transmission comprises a PUSCH portion of a request message of a two-step random access channel procedure.

In an eighteenth aspect, alone or in combination with one or more of the first through seventeenth aspects, the paging message indicates the set of resources corresponding to the CSI-RS based at least in part on at least one of a determination that the SSB beam satisfies an SSB beam condition, a determination that one or more beam-specific bitfields in remaining minimum system information include one or more specified values, or a determination that a beam-specific property associated with the paging message satisfies a paging condition.

In a nineteenth aspect, alone or in combination with one or more of the first through eighteenth aspects, transmitting the paging message comprises transmitting the paging message based at least in part on the SSB comprising one of a subset of SSB beams of a set of SSB beams.

In a twentieth aspect, alone or in combination with one or more of the first through nineteenth aspects, the set of resources corresponding to the CSI-RS comprises at least one of a time domain resource, or a frequency domain resource.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
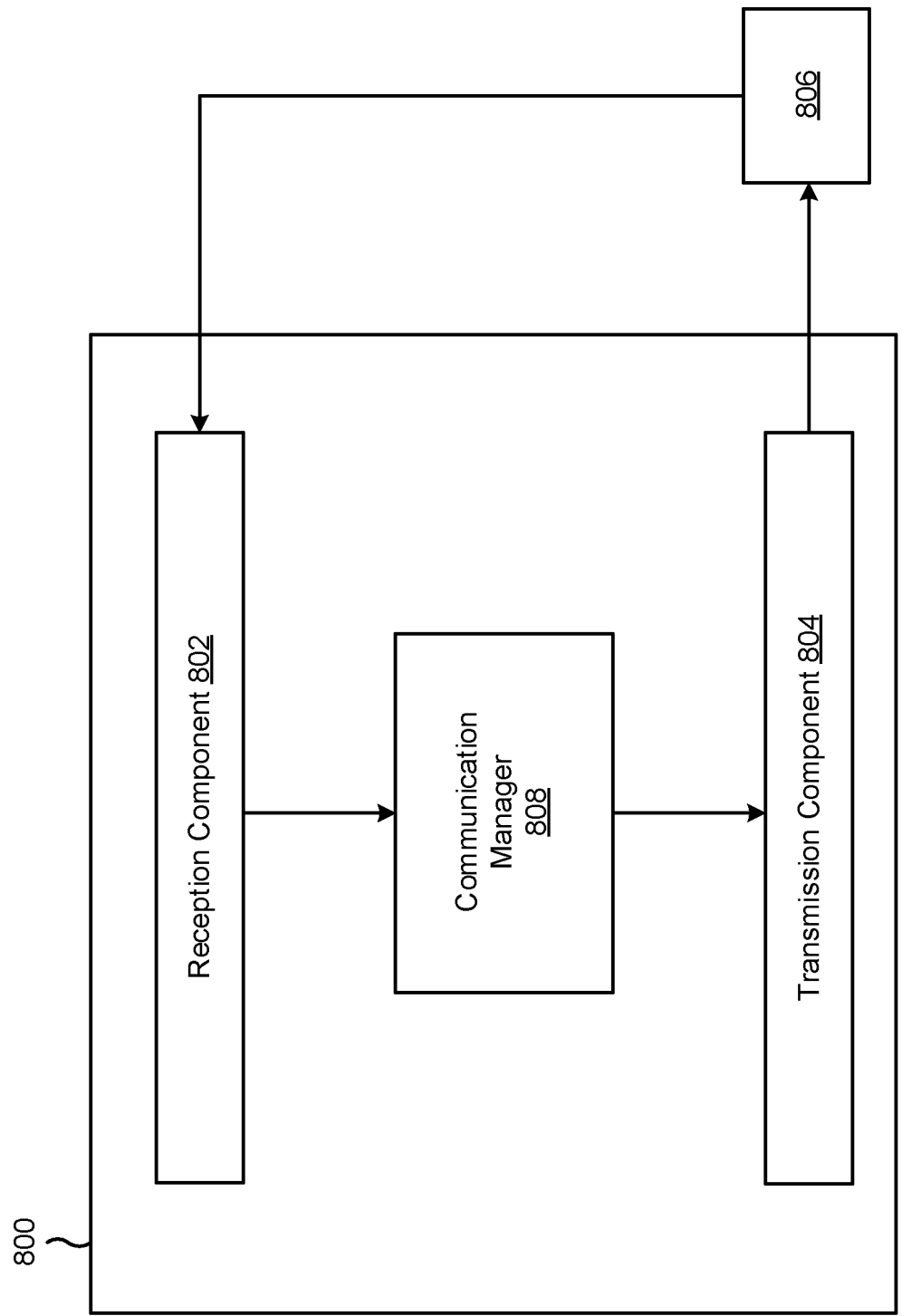
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808, among other examples. The communication manager 808 may facilitate determining CSI-RS parameters and/or resources based on implicit indications thereof, measurement of CSI, and/or selection of refined beams, among other examples.

In some aspects, the apparatus 800 may be configured to perform one or more operations described herein in connection with FIG. 5. Additionally or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The reception component 802 may receive a paging message that indicates a set of resources corresponding to a CSI-RS associated with a plurality of refined sub-beams of an SSB beam. The transmission component 804 may transmit, in a transmission associated with a PRACH, an indication of a selected sub-beam of the plurality of refined sub-beams.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
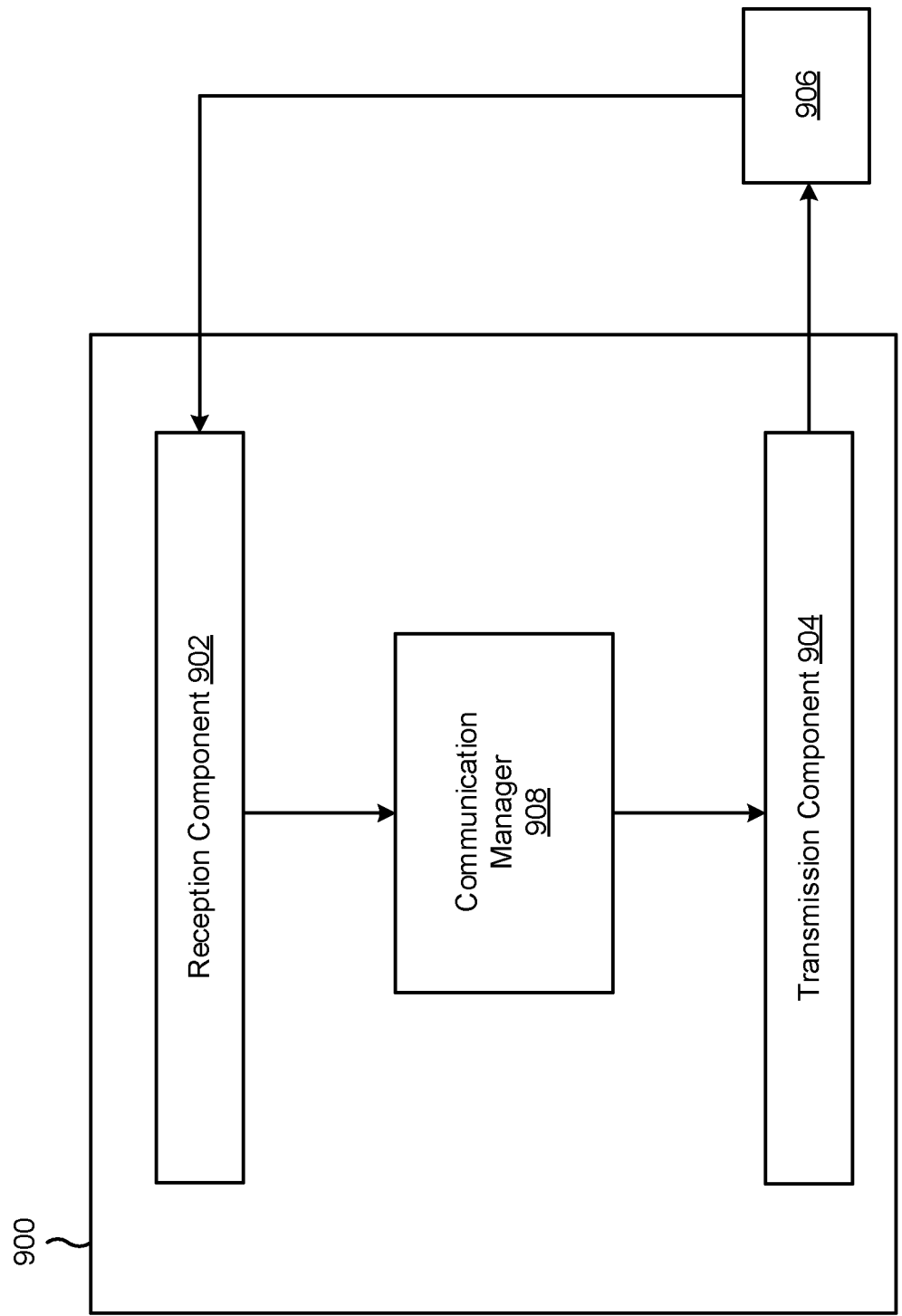

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 that may facilitate one or more beam refinement operations based at least in part on CSI feedback received from a UE.

In some aspects, the apparatus 900 may be configured to perform one or more operations described herein in connection with FIG. 5. Additionally or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be collocated with the reception component 902 in a transceiver.

The transmission component 904 may transmit a paging message that indicates a set of resources corresponding to a CSI-RS associated with a plurality of refined sub-beams of an SSB beam. The reception component 902 may receive, in a transmission associated with a PRACH, an indication of a selected sub-beam of the plurality of refined sub-beams.

The communication manager 908 may facilitate one or more beam refinement operations based at least in part on CSI feedback received from a UE. The communication manager 908 may control and/or manage one or more aspects of operations of the reception component 802 and/or the transmission component 804. In some aspects, the communication manager 908 may include one or more antennas, a modulator, a transmit MIMO processor, a transmit processor, a controller/processor, a memory, or a combination thereof, of the base station described above in connection with FIG. 2. In some aspects, the communication manager 908 may include the reception component 802 and/or the transmission component 804.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a paging message that indicates a set of resources corresponding to a channel state information (CSI)-reference signal (CSI-RS) associated with a plurality of refined sub-beams of a synchronization signal block (SSB) beam; and transmitting, in a transmission associated with a physical random access channel (PRACH), an indication of a selected sub-beam of the plurality of refined sub-beams.

Aspect 2: The method of Aspect 1, wherein the transmission associated with the PRACH comprises a PRACH transmission.

Aspect 3: The method of either of Aspects 1 or 2, wherein the set of resources corresponding to the CSI-RS are explicitly scheduled by the paging message.

Aspect 4: The method of any of Aspects 1-3, wherein the set of resources corresponding to the CSI-RS are implicitly indicated based at least in part on one or more parameters indicated by the paging message.

Aspect 5: The method of Aspect 4, wherein the one or more parameters comprise at least one of: a time resource associated with one or more random access channel (RACH) occasions of the PRACH, or a frequency resource associated with one or more RACH occasions of the PRACH.

Aspect 6: The method of either of Aspects 4 or 5, further comprising determining the set of resources corresponding to the CSI-RS based at least in part on the one or more parameters.

Aspect 7: The method of any of Aspects 1-6, wherein transmitting the indication of the selected sub-beam comprises transmitting an indication of at least one of: a selected preamble sequence, or a selected random access channel (RACH) occasion corresponding to the selected preamble sequence.

Aspect 8: The method of Aspect 7, wherein the indication of the selected sub-beam is based at least in part on a mapping of the plurality of refined sub-beams to at least one of: a plurality of preamble sequences comprising the selected preamble sequence, or a plurality of RACH occasions comprising the selected RACH occasion.

Aspect 9: The method of Aspect 8, wherein the mapping of the plurality of refined sub-beams comprises a mapping of the set of resources corresponding to the CSI-RS to the at least one of: the plurality of preamble sequences comprising the selected preamble sequence, or the plurality of RACH occasions comprising the selected RACH occasion.

Aspect 10: The method of any of Aspects 7-9, wherein the mapping is based at least in part on a rule.

Aspect 11: The method of Aspect 10, wherein the rule is defined in a wireless communication specification.

Aspect 12: The method of any of Aspects 7-10, wherein the mapping is based at least in part on one or more mapping parameters.

Aspect 13: The method of Aspect 12, wherein the one or more mapping parameters are indicated by at least one of: the paging message, remaining minimum system information, or other system information.

Aspect 14: The method of any of Aspects 1-13, wherein the transmission associated with the PRACH comprises a CSI report associated with the PRACH.

Aspect 15: The method of Aspect 14, wherein the transmission is based at least in part on a mapping between at least one random access channel (RACH) occasion and at least one resource associated with the CSI report.

Aspect 16: The method of Aspect 15, wherein the mapping is defined in a wireless communication specification.

Aspect 17: The method of either of Aspects 15 or 16, wherein the paging message indicates the mapping.

Aspect 18: The method of any of Aspects 1-17, wherein the transmission comprises a physical uplink shared channel (PUSCH) transmission that occurs after a transmission of a random access channel preamble.

Aspect 19: The method of any of Aspects 1-18, wherein the transmission comprises a PUSCH portion of a request message of a two-step random access channel procedure.

Aspect 20: The method of any of Aspects 1-19, wherein the paging message indicates the set of resources corresponding to the CSI-RS based at least in part on at least one of: a determination that the SSB beam satisfies an SSB beam condition, a determination that one or more beam-specific bitfields in remaining minimum system information include one or more specified values, or a determination that a beam-specific property associated with the paging message satisfies a paging condition.

Aspect 21: The method of any of Aspects 1-20, wherein receiving the paging message comprises receiving the paging message based at least in part on the SSB comprising one of a subset of SSB beams of a set of SSB beams.

Aspect 22: The method of any of Aspects 1-21, wherein the set of resources corresponding to the CSI-RS comprises at least one of: a time domain resource, or a frequency domain resource.

Aspect 23: A method of wireless communication performed by a base station, comprising: transmitting a paging message that indicates a set of resources corresponding to a channel state information (CSI)-reference signal (CSI-RS) associated with a plurality of refined sub-beams of a synchronization signal block (SSB) beam; and receiving, in a transmission associated with a physical random access channel (PRACH), an indication of a selected sub-beam of the plurality of refined sub-beams.

Aspect 24: The method of Aspect 23, wherein the transmission associated with the PRACH comprises a PRACH transmission.

Aspect 25: The method of either of Aspects 23 or 24, wherein the set of resources corresponding to the CSI-RS are explicitly scheduled by the paging message.

Aspect 26: The method of any of Aspects 23-25, wherein the set of resources corresponding to the CSI-RS are implicitly indicated based at least in part on one or more parameters indicated by the paging message.

Aspect 27: The method of Aspect 26, wherein the one or more parameters comprise at least one of: a time resource associated with one or more random access channel (RACH) occasions of the PRACH, or a frequency resource associated with one or more RACH occasions of the PRACH.

Aspect 28: The method of any of Aspects 23-27, wherein receiving the indication of the selected sub-beam comprises receiving an indication of at least one of: a selected preamble sequence, or a selected random access channel (RACH) occasion corresponding to the selected preamble sequence.

Aspect 29: The method of Aspect 28, wherein the indication of the selected sub-beam is based at least in part on a mapping of the plurality of refined sub-beams to at least one of: a plurality of preamble sequences comprising the selected preamble sequence, or a plurality of RACH occasions comprising the selected RACH occasion.

Aspect 30: The method of Aspect 29, wherein the mapping of the plurality of refined sub-beams comprises a mapping of the set of resources corresponding to the CSI-RS to the at least one of: the plurality of preamble sequences comprising the selected preamble sequence, or the plurality of RACH occasions comprising the selected RACH occasion.

Aspect 31: The method of either of Aspects 29 or 30, wherein the mapping is based at least in part on a rule.

Aspect 32: The method of Aspect 31, wherein the rule is defined in a wireless communication specification.

Aspect 33: The method of any of Aspects 29-32, wherein the mapping is based at least in part on one or more mapping parameters.

Aspect 34: The method of Aspect 33, wherein the one or more mapping parameters are indicated by at least one of: the paging message, remaining minimum system information, or other system information.

Aspect 35: The method of any of Aspects 23-34, wherein the transmission associated with the PRACH comprises a CSI report associated with the PRACH.

Aspect 36: The method of Aspect 35, wherein the transmission is based at least in part on a mapping between at least one random access channel (RACH) occasion and at least one resource associated with the CSI report.

Aspect 37: The method of Aspect 36, wherein the mapping is defined in a wireless communication specification.

Aspect 38: The method of either of Aspects 36 or 37, wherein the paging message indicates the mapping.

Aspect 39: The method of any of Aspects 23-38, wherein the transmission comprises a physical uplink shared channel (PUSCH) transmission that occurs after a transmission of a random access channel preamble.

Aspect 40: The method of any of Aspects 23-39, wherein the transmission comprises a PUSCH portion of a request message of a two-step random access channel procedure.

Aspect 41: The method of any of Aspects 23-40, wherein the paging message indicates the set of resources corresponding to the CSI-RS based at least in part on at least one of: a determination that the SSB beam satisfies an SSB beam condition, a determination that one or more beam-specific bitfields in remaining minimum system information include one or more specified values, or a determination that a beam-specific property associated with the paging message satisfies a paging condition.

Aspect 42: The method of any of Aspects 23-41, wherein transmitting the paging message comprises transmitting the paging message based at least in part on the SSB comprising one of a subset of SSB beams of a set of SSB beams.

Aspect 43: The method of any of Aspects 23-42, wherein the set of resources corresponding to the CSI-RS comprises at least one of: a time domain resource, or a frequency domain resource.

Aspect 44: An apparatus for wireless communication at a device, comprising a processor; memory coupled with the processor; and instructions stored in the memory and executable by the processor to cause the apparatus to perform the method of one or more of Aspects 1-22.

Aspect 45: A device for wireless communication, comprising a memory and one or more processors coupled to the memory, the one or more processors configured to perform the method of one or more of Aspects 1-22.

Aspect 46: An apparatus for wireless communication, comprising at least one means for performing the method of one or more of Aspects 1-22.

Aspect 47: A non-transitory computer-readable medium storing code for wireless communication, the code comprising instructions executable by a processor to perform the method of one or more of Aspects 1-22.

Aspect 48: A non-transitory computer-readable medium storing a set of instructions for wireless communication, the set of instructions comprising one or more instructions that, when executed by one or more processors of a device, cause the device to perform the method of one or more of Aspects 1-22.

Aspect 49: An apparatus for wireless communication at a device, comprising a processor; memory coupled with the processor; and instructions stored in the memory and executable by the processor to cause the apparatus to perform the method of one or more of Aspects 23-43.

Aspect 50: A device for wireless communication, comprising a memory and one or more processors coupled to the memory, the one or more processors configured to perform the method of one or more of Aspects 23-43.

Aspect 51: An apparatus for wireless communication, comprising at least one means for performing the method of one or more of Aspects 23-43.

Aspect 52: A non-transitory computer-readable medium storing code for wireless communication, the code comprising instructions executable by a processor to perform the method of one or more of Aspects 23-43.

Aspect 53: A non-transitory computer-readable medium storing a set of instructions for wireless communication, the set of instructions comprising one or more instructions that, when executed by one or more processors of a device, cause the device to perform the method of one or more of Aspects 23-43.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors, coupled to the memory, configured to:
   receive a paging message that includes an indication of a set of resources corresponding to a channel state information (CSI)-reference signal (CSI-RS) associated with a plurality of refined sub-beams of a synchronization signal block (SSB) beam;
   receive the CSI-RS based on the indication included in the paging message; and
   transmit, in a transmission associated with a physical random access channel (PRACH), an indication of a selected sub-beam of the plurality of refined sub-beams.

2. The UE of claim 1, wherein the transmission associated with the PRACH comprises a PRACH transmission.

3. The UE of claim 1, wherein the set of resources corresponding to the CSI-RS are explicitly scheduled by the paging message.

4. The UE of claim 1, wherein the set of resources corresponding to the CSI-RS are implicitly indicated based at least in part on one or more parameters indicated by the paging message.

5. The UE of claim 4, wherein the one or more parameters comprise at least one of:
   a time resource associated with one or more random access channel (RACH) occasions of the PRACH, or
   a frequency resource associated with one or more RACH occasions of the PRACH.

6. The UE of claim 4, wherein the one or more processors are further configured to determine the set of resources corresponding to the CSI-RS based at least in part on the one or more parameters.

7. The UE of claim 1, wherein the one or more processors, to transmit the indication of the selected sub-beam, are configured to transmit an indication of at least one of:
   a selected preamble sequence, or
   a selected random access channel (RACH) occasion corresponding to the selected preamble sequence.

8. The UE of claim 7, wherein the indication of the selected sub-beam is based at least in part on a mapping of the plurality of refined sub-beams to at least one of:
   a plurality of preamble sequences comprising the selected preamble sequence, or
   a plurality of RACH occasions comprising the selected RACH occasion.

9. The UE of claim 8, wherein the mapping of the plurality of refined sub-beams comprises a mapping of the set of resources corresponding to the CSI-RS to the at least one of:
   the plurality of preamble sequences comprising the selected preamble sequence, or
   the plurality of RACH occasions comprising the selected RACH occasion.

10. The UE of claim 8, wherein the mapping is based at least in part on a rule.

11. The UE of claim 10, wherein the rule is defined in a wireless communication specification.

12. The UE of claim 8, wherein the mapping is based at least in part on one or more mapping parameters.

13. The UE of claim 12, wherein the one or more mapping parameters are indicated by at least one of:
   the paging message,
   remaining minimum system information, or
   other system information.

14. The UE of claim 1, wherein the transmission associated with the PRACH comprises a CSI report associated with the PRACH.

15. The UE of claim 14, wherein the transmission is based at least in part on a mapping between at least one random access channel (RACH) occasion and at least one resource associated with the CSI report.

16. The UE of claim 15, wherein the mapping is defined in a wireless communication specification.

17. The UE of claim 15, wherein the paging message indicates the mapping.

18. The UE of claim 1, wherein the transmission comprises a physical uplink shared channel (PUSCH) transmission that occurs after a transmission of a random access channel preamble.

19. The UE of claim 1, wherein the transmission comprises a PUSCH portion of a request message of a two-step random access channel procedure.

20. The UE of claim 1, wherein the paging message indicates the set of resources corresponding to the CSI-RS based at least in part on at least one of:
- a determination that the SSB beam satisfies an SSB beam condition,
- a determination that one or more beam-specific bitfields in remaining minimum system information include one or more specified values, or
- a determination that a beam-specific property associated with the paging message satisfies a paging condition.

21. The UE of claim 1, wherein the one or more processors, to receive the paging message, are configured to receive the paging message based at least in part on the SSB comprising one of a subset of SSB beams of a set of SSB beams.

22. The UE of claim 1, wherein the set of resources corresponding to the CSI-RS comprises at least one of:
- a time domain resource, or
- a frequency domain resource.

23. The UE of claim 1, wherein the one or more processors are further configured to:
- receive the CSI-RS on the set of resources based on receipt of the paging message; and
- select the selected sub-beam from the plurality of refined sub-beams based on the CSI-RS, wherein the transmission associated with the PRACH comprises a CSI report that includes the indication of the selected sub-beam.

24. A base station for wireless communication, comprising:
- memory; and
- one or more processors, coupled to the memory, configured to:
  - transmit a paging message that includes an indication of a set of resources corresponding to a channel state information (CSI)-reference signal (CSI-RS) associated with a plurality of refined sub-beams of a synchronization signal block (SSB) beam;
  - transmit the CSI-RS using the set of resources indicated in the paging message; and
  - receive, in a transmission associated with a physical random access channel (PRACH), an indication of a selected sub-beam of the plurality of refined sub-beams.

25. The base station of claim 24, wherein the set of resources corresponding to the CSI-RS are explicitly scheduled by the paging message.

26. The base station of claim 24, wherein the set of resources corresponding to the CSI-RS are implicitly indicated based at least in part on one or more parameters indicated by the paging message.

27. The base station of claim 24, wherein the one or more processors, to receive the indication of the selected sub-beam, are configured to receive an indication of at least one of:
- a selected preamble sequence, or
- a selected random access channel (RACH) occasion corresponding to the selected preamble sequence.

28. A method of wireless communication performed by a user equipment (UE), comprising:
- receiving a paging message that includes an indication of a set of resources corresponding to a channel state information (CSI)-reference signal (CSI-RS) associated with a plurality of refined sub-beams of a synchronization signal block (SSB) beam;
- receiving the CSI-RS based on the indication included in the paging message; and
- transmitting, in a transmission associated with a physical random access channel (PRACH), an indication of a selected sub-beam of the plurality of refined sub-beams.

29. The method of claim 28, wherein the set of resources corresponding to the CSI-RS are implicitly indicated based at least in part on one or more parameters indicated by the paging message.

30. A method of wireless communication performed by a base station, comprising:
- transmitting a paging message that includes an indication of a set of resources corresponding to a channel state information (CSI)-reference signal (CSI-RS) associated with a plurality of refined sub-beams of a synchronization signal block (SSB) beam;
- transmitting the CSI-RS using the set of resources indicated in the paging message; and
- receiving, in a transmission associated with a physical random access channel (PRACH), an indication of a selected sub-beam of the plurality of refined sub-beams.

31. The method of claim 30, wherein the set of resources corresponding to the CSI-RS are implicitly indicated based at least in part on one or more parameters indicated by the paging message.

* * * * *